(12) United States Patent
Dalton, Jr. et al.

(10) Patent No.: US 8,306,020 B2
(45) Date of Patent: Nov. 6, 2012

(54) ARCHITECTURES FOR CLEARING AND SETTLEMENT SERVICES BETWEEN INTERNET TELEPHONY CLEARINGHOUSES

(75) Inventors: James P. G. Dalton, Jr., Atlanta, GA (US); Stephen A. Thomas, Marietta, GA (US)

(73) Assignee: TRANSNEXUS, Inc., Atlanta, GA (US)

( * ) Notice: Subject to any disclaimer, the term of this patent is extended or adjusted under 35 U.S.C. 154(b) by 850 days.

(21) Appl. No.: 12/381,900

(22) Filed: Mar. 17, 2009

(65) Prior Publication Data

US 2009/0245237 A1 Oct. 1, 2009

Related U.S. Application Data

(63) Continuation of application No. 11/229,335, filed on Sep. 16, 2005, now Pat. No. 7,525,956.

(51) Int. Cl.
*H04L 12/66* (2006.01)
(52) U.S. Cl. .................................... 370/352; 370/401
(58) Field of Classification Search .................. None
See application file for complete search history.

(56) References Cited

U.S. PATENT DOCUMENTS

| | | |
|---|---|---|
| 4,726,056 A | 2/1988 | An et al. |
| 4,979,118 A | 12/1990 | Kheradpir ..................... 364/436 |
| 5,155,763 A | 10/1992 | Bigus et al. ..................... 379/113 |
| 5,185,780 A | 2/1993 | Leggett ..................... 379/34 |
| 5,251,152 A | 10/1993 | Notess ..................... 364/550 |
| 5,325,290 A | 6/1994 | Cauffman et al. ............ 364/401 |
| 5,404,516 A | 4/1995 | Georgiades et al. ........... 395/650 |
| 5,408,465 A | 4/1995 | Gusella et al. ................... 370/17 |
| 5,434,848 A | 7/1995 | Chimento, Jr. et al. |
| 5,473,630 A | 12/1995 | Penzias et al. |
| 5,563,939 A | 10/1996 | La Porta et al. |
| 5,570,417 A | 10/1996 | Byers et al. |
| 5,581,544 A | 12/1996 | Hamada et al. ............... 370/253 |
| 5,600,794 A | 2/1997 | Callon ..................... 395/200.01 |
| 5,606,602 A | 2/1997 | Johnson et al. |

(Continued)

FOREIGN PATENT DOCUMENTS

EP 0 781 015 A2 6/1997

(Continued)

OTHER PUBLICATIONS

ETSI, "Telecommunications and Internet Protocol Harmonization Over Networks (TIPHON) Release 4; Open Settlement Protocol (OSP) for Inter-Domain pricing, authorization and usage exchange," ETSI TS 101 321, V4.1.1 (Nov. 2003) Technical Specification, pp. 49.

(Continued)

*Primary Examiner* — Phirin Sam
(74) *Attorney, Agent, or Firm* — Smith Risley; Steven P. Wigmore

(57) ABSTRACT

A system for routing voice telephone calls over IP networks as opposed to traditional switched circuit networks. The voice communications during the telephone call are packaged as digital data and access the Internet through gateways. The system supports the linking of a source gateway in a first clearinghouse to a destination gateway in a second clearinghouse. The system further supports the selection of a destination gateway based on factors such as cost, speed of routing, and transmission quality of the voice data. The components of the system are arranged so as to minimize the number of signals sent between clearinghouses in identifying the optimal destination gateway.

20 Claims, 11 Drawing Sheets

U.S. PATENT DOCUMENTS

| | | | |
|---|---|---|---|
| 5,633,919 A | 5/1997 | Hogan et al. | |
| 5,638,433 A | 6/1997 | Bubien, Jr. et al. | |
| 5,668,955 A | 9/1997 | deCiutiis et al. | |
| 5,675,636 A | 10/1997 | Gray | |
| 5,712,907 A | 1/1998 | Wegner et al. | |
| 5,740,361 A | 4/1998 | Brown | 395/187.01 |
| 5,790,642 A | 8/1998 | Taylor et al. | |
| 5,799,072 A | 8/1998 | Vulcan et al. | |
| 5,867,495 A | 2/1999 | Elliott et al. | 370/352 |
| 5,892,753 A | 4/1999 | Badt et al. | 370/233 |
| 5,898,668 A | 4/1999 | Shaffer | 370/230 |
| 5,898,673 A | 4/1999 | Riggan et al. | 370/237 |
| 5,917,891 A | 6/1999 | Will | 379/88.03 |
| 5,917,897 A | 6/1999 | Johnson et al. | |
| 5,917,902 A | 6/1999 | Saucier | |
| 5,943,657 A | 8/1999 | Freestone et al. | |
| 5,966,427 A | 10/1999 | Shaffer et al. | |
| 5,991,373 A | 11/1999 | Pattison et al. | 379/93.17 |
| 5,995,554 A | 11/1999 | Lang | 375/295 |
| 6,005,925 A | 12/1999 | Johnson et al. | |
| 6,005,926 A | 12/1999 | Mashinsky | |
| 6,014,686 A * | 1/2000 | Elnozahy et al. | 709/202 |
| 6,049,531 A | 4/2000 | Roy | |
| 6,067,287 A | 5/2000 | Chung-Ju et al. | 370/232 |
| 6,084,953 A | 7/2000 | Bardenheuer et al. | |
| 6,085,238 A | 7/2000 | Yuasa et al. | 709/223 |
| 6,128,280 A | 10/2000 | Jamoussi et al. | 370/230 |
| 6,128,304 A | 10/2000 | Gardell et al. | |
| 6,137,869 A | 10/2000 | Voit et al. | 379/114.01 |
| 6,157,648 A | 12/2000 | Voit et al. | |
| 6,178,510 B1 | 1/2001 | O'Connor et al. | |
| 6,205,211 B1 | 3/2001 | Thomas et al. | |
| 6,229,804 B1 | 5/2001 | Mortsolf et al. | |
| 6,240,449 B1 | 5/2001 | Nadeau | |
| 6,259,691 B1 | 7/2001 | Naudus | |
| 6,263,051 B1 | 7/2001 | Saylor et al. | 379/88.17 |
| 6,275,490 B1 | 8/2001 | Mattaway et al. | 370/352 |
| 6,304,551 B1 | 10/2001 | Ramamurthy et al. | 370/232 |
| 6,310,873 B1 | 10/2001 | Rainis et al. | 370/356 |
| 6,317,490 B1 | 11/2001 | Cameron et al. | |
| 6,330,311 B1 | 12/2001 | Mijares, Jr. et al. | |
| 6,339,595 B1 | 1/2002 | Rekhter et al. | 370/392 |
| 6,345,090 B1 | 2/2002 | Walker et al. | 379/114.12 |
| 6,366,577 B1 | 4/2002 | Donovan | 370/352 |
| 6,404,746 B1 | 6/2002 | Cave et al. | |
| 6,426,955 B1 | 7/2002 | Gossett Dalton et al. | |
| 6,430,282 B1 | 8/2002 | Bannister et al. | 379/211.02 |
| 6,459,708 B1 | 10/2002 | Cox et al. | |
| 6,477,164 B1 | 11/2002 | Vargo et al. | |
| 6,487,283 B2 | 11/2002 | Thomas et al. | 379/112.01 |
| 6,526,131 B1 | 2/2003 | Zimmerman et al. | 379/242 |
| 6,570,870 B1 | 5/2003 | Berstis | 370/352 |
| 6,611,519 B1 | 8/2003 | Howe | |
| 6,614,781 B1 | 9/2003 | Elliott et al. | |
| 6,615,349 B1 | 9/2003 | Hair | 713/165 |
| 6,658,568 B1 | 12/2003 | Ginter et al. | 713/193 |
| 6,665,271 B1 | 12/2003 | Thomas et al. | 370/252 |
| 6,680,948 B1 | 1/2004 | Majd et al. | 370/401 |
| 6,707,812 B1 | 3/2004 | Bowman-Amuah | |
| 6,735,177 B1 | 5/2004 | Suzuki | 370/238 |
| 6,751,652 B1 * | 6/2004 | Thomas | 709/204 |
| 6,754,181 B1 | 6/2004 | Elliott et al. | |
| 6,757,823 B1 | 6/2004 | Rao et al. | 713/153 |
| 6,765,896 B1 | 7/2004 | Ahmed et al. | |
| 6,795,867 B1 | 9/2004 | Ma et al. | |
| 6,937,598 B1 | 8/2005 | Hagirahim et al. | |
| 6,996,093 B2 | 2/2006 | Dalton, Jr. et al. | 370/356 |
| 7,017,050 B2 | 3/2006 | Dalton, Jr. et al. | 713/201 |
| 7,035,252 B2 * | 4/2006 | Cave et al. | 370/356 |
| 7,225,269 B2 * | 5/2007 | Watanabe | 709/238 |
| 7,289,489 B1 * | 10/2007 | Kung et al. | 370/352 |
| 7,293,080 B1 | 11/2007 | Clemm et al. | |
| 7,865,621 B1 * | 1/2011 | Koo et al. | 709/249 |
| 2002/0029276 A1 * | 3/2002 | Bendinelli et al. | 709/227 |
| 2002/0041588 A1 | 4/2002 | Gleneck | |
| 2003/0012178 A1 | 1/2003 | Mussman et al. | 370/352 |
| 2003/0095541 A1 | 5/2003 | Chang et al. | |
| 2003/0193933 A1 | 10/2003 | Jonas et al. | |
| 2004/0042606 A1 | 3/2004 | Zino et al. | 379/220.01 |
| 2004/0174880 A1 | 9/2004 | White et al. | |

FOREIGN PATENT DOCUMENTS

| | | |
|---|---|---|
| EP | 0 824 295 A2 | 2/1998 |
| EP | 0 948 164 | 10/1999 |
| GB | 2 301 264 | 11/1996 |
| WO | WO 97/14236 | 4/1997 |
| WO | WO 97/23078 | 6/1997 |
| WO | WO 98/18237 | 4/1998 |
| WO | WO 98/36543 | 8/1998 |
| WO | WO 98/37665 | 8/1998 |
| WO | WO 98/48542 | 10/1998 |
| WO | WO 99/11051 | 3/1999 |
| WO | WO 99/14931 | 3/1999 |
| WO | WO 99/14932 | 3/1999 |
| WO | WO 99/26153 | 5/1999 |
| WO | WO 00/48102 | 8/2000 |
| WO | WO 00/49551 | 8/2000 |
| WO | WO 00/52905 | 9/2000 |
| WO | WO 01/47232 A2 | 6/2001 |
| WO | WO 01/47235 A2 | 6/2001 |
| WO | WO 01/52476 A2 | 7/2001 |
| WO | WO 01/63820 A2 | 8/2001 |
| WO | WO 02/23854 A2 | 3/2002 |
| WO | WO 2005/089147 A2 | 9/2005 |
| WO | WO 2006/065789 A2 | 6/2006 |

OTHER PUBLICATIONS

Johannesson, Nils Olof, "*The ETSI Computation Model: A Tool for Transmission Planning of Telephone Networks*," IEEE Communications Magazine, Jan. 1997, pp. 70-79.

Netscape Communications Corporation, "*Introduction to SSL*," Oct. 9, 1998, [Retrieved from Internet May 19, 2004], http://developer.netscape.com/docs/manuals/security/sslin/contents.htm, pp. 12.

RSA Security Press Release, "*TransNexus Integrates Industry Leader RSA Security's BSAFE Encryption Software Into Its ClearIP$^{SM}$ Clearinghouse Solution*," Oct. 21, 1999, Abstract XP-002193409, www.rsasecurity.com.

Sin, Sam-Kit et al., "*A New Design Methodology for Optimal Interpolative Neural Networks with Application to the Localization and Classification of Acoustic Transients*," IEEE Conference on Neural Networks for Ocean Engineering, 1991, pp. 329-340.

TransNexus Home Page, Printed May 17, 2005, www.transnexus.com, 2 pp.

TransNexus Press Release, "*Agis and Popstar Introduce Profit-Generating Internet Fax Services to ISP Partners and Customers Worldwide*," Abstract XP-002193408, Jun. 24, 1999, www.transnexus.com, 3 pp.

Chaniotakis et al., "*Parlay and Mobile Agents in a Homogenized Service Provision Architecture*," IEEE; Universal Multiservice Networks; ECUMN 2002; 2$^{nd}$ European Conference on Apr. 8-10, 2002; pp. 150-154.

Liao, Wanjiun; "*Mobile Internet Telephony Protocol: An application layer protocol for mobile Internet telephony services*," Communications, 1999; ICC '99; 1999 IEEE International Conference; vol. 1; Jun. 6-10, 1999; pp. 339-343.

Maresca et al.; "*Internet Protocol Support for Telephony*," Proceedings of the IEEE, vol. 92, No. 9; Sep. 2004; pp. 1463-1477.

AT&T Communications, Adm. Rates and Tariffs, Tariff FCC No. 1, 3$^{rd}$ Revised p. 178.69.1.

Thom, Gary A., "H.323: The Multimedia Communications Standard for Local Area Networks," Dec. 1996, pp. 52-56, IEEE Communications Magazine.

Rudkin et al, "Real-time applications on the Internet," Apr. 1997, pp. 209-225, BT Technol J vol. 15, No. 2.

The Ascend Max Gateway, XP-002096239, "The asnet pipeline," www.asnet.co.nz/pipeline/sum97/tamvg.html, Mar. 11, 1999.

Hansson et al., "Phone Doubler—A step towards integrated Internet and telephone communities," Ericsson Review No. 4, 1997, pp. 142-151.

At&T Communications, Adm. Rates and Tariffs, Tariff FCC No. 1, 3$^{rd}$ Revised, p. 178.69.1, Jan. 1993.

* cited by examiner

ARCHITECTURES FOR CLEARING AND SETTLEMENT SERVICES BETWEEN INTERNET TELEPHONY CLEARINGHOUSES

CROSS REFERENCE TO RELATED APPLICATION PRIORITY

This application is a continuation of and claims priority to U.S. application Ser. No. 11/229,335 filed Sep. 16, 2005 now U.S. Pat. No. 7,525,956, entitled, "Architectures for Clearing and Settlement Services Between Internet Telephony Clearinghouses", the entire contents of which are hereby incorporated by reference.

TECHNICAL FIELD

The present invention generally relates to architectures for voice over IP (Internet Protocol) communications. More specifically, the present invention allows for quicker and more direct routing of voice communications between Internet Telephony Clearinghouses.

BACKGROUND OF THE INVENTION

As an alternative to traditional switched circuit networks, telecommunications service providers have discovered that voice telephone calls may be routed over IP networks. Due to the fact that the Internet is not presently subject to the same international regulations as are traditional telephone networks, routing telephone calls over the Internet tends to be less expensive. Additionally, an IP routed voice telephone call requires much less bandwidth, and thus less cost, than a voice telephone call placed over a traditional telephone network. Further, IP technology advances and is entered into the marketplace at a much faster rate than traditional telecommunication technology. Thus, in order to be competitive, telecommunications service providers have begun to use IP routing as a way to offer customers access to the latest technological improvements.

Presently, however, there is no centralized system for routing voice telephone calls over an IP network. Each operator of a gateway is responsible for determining the routes for its own outgoing calls. Typically, gateway operators rely on traditional IP routing algorithms, which are designed to handle routing of computer generated data packets. Traditional IP routing algorithms attempt to strike a balance between the concerns of minimum delay and maximum reliability. Thus, using traditional IP routing algorithms, a voice telephone call will be routed to any destination gateway that happens to satisfy a set of predetermined shortest path and acceptable data loss parameters.

The routing of voice telephone calls, however, involves a significant concern that is not shared by traditional IP routing algorithms. This additional concern is the monetary cost of routing a voice call to a particular destination gateway. As in traditional switched circuit networks, Internet telephony gateways impose fees for the service of terminating a voice call. Traditional IP routing algorithms are not able to detect and compare the varying price schedules that may be imposed by various Internet telephony gateways. Thus, source gateways are not able to discriminate between destination gateways based on monetary costs.

One way a gateway operator can establish the cost for IP telephony services is by negotiating directly with other gateway operators a fee for terminating each other's calls. These gateway operators could identify each other and establish a bilateral agreement or a multilateral agreement. This approach closely resembles that of the international circuit switch telephony network, where providers in each country have established bilateral and multilateral agreements with each other. A significant hurdle for this routing implementation, however, is the large number of business relationships that must be negotiated and maintained. For example, should 1,000 local operators decide to interconnect via bilateral agreements, 999,000 separate agreements would be necessary. Interconnection through a centralized system, however, would require only 1,000 separate business agreements, each with a separate operator.

Another disadvantage with a bilateral agreement model is that the gateway operators are not able to react quickly and intelligently to changing market forces because the bilateral agreements are generally long-term contracts. For example, when there is a sudden increase in demand for terminating calls to a particular area, the gateway operator in that area is unable to increase his terminating charges and take advantage of a demand. Additionally, a bilateral agreement model or the multilateral agreement model are too cumbersome for the gateway operators to set call pricing based on selected call number ranges (any given subset of all possible telephone numbers). This is especially true if the total number of telephone numbers comprising a called-number range is too small. For example, it may be too cumbersome for the gateway operators to negotiate a specific call pricing plan for a specific customer with less than 100 numbers within their called-number range.

In order to assist gateway operators with routing decisions, a centralized system can be provided where Internet Telephony Service Providers (ITSPs) become members of this centralized system. The centralized system is generally referred to as a clearinghouse. Clearinghouse services attempt to capture IP telephony traffic in order to receive the revenue associated with that traffic. By joining a clearinghouse service, an ITSP stimulates traffic growth on its network and gains access to other gateways. The clearinghouse not only routes and authorizes IP telephony traffic, but also handles the billing for the call.

One function of a clearinghouse is to link source gateways to destination gateways within the clearinghouse. However, the advantages gained with a clearinghouse are limited in that the ITSP cannot go beyond its clearinghouse to access gateways of another clearinghouse. Thus, a need exists for a system to support the linking of separate clearinghouse services. Specifically, there is a need in the art for a gateway operator to be able to easily locate gateways with desirable characteristics in another clearinghouse. There is a further need for a system and method to support recording and billing of the transaction between the two gateways.

SUMMARY OF THE INVENTION

The present invention satisfies the above-described needs by providing a system that links IP telephony clearinghouses. The linking of IP telephony clearinghouses can be accomplished in several ways. Two or more clearinghouses can share information about their respective gateways. The gateways may be designated as source gateways, destination gateways, or both. The amount of information a clearinghouse desires to share with a linking clearinghouse typically will control the specific architecture of the linking clearinghouse.

Once one or more clearinghouses share information and the architecture for the linking clearinghouse is established, a calling or originating gateway of a first clearinghouse may connect to a gateway of another second clearinghouse. That is, a call can be initiated by a calling party and the calling party's source gateway of a first clearinghouse. The source gateway of the first clearinghouse can connect the calling party to a linking clearinghouse via an IP network, such as the Internet.

At the linking clearinghouse, decisions can be made about how a destination gateway in other, second clearinghouses not associated with the source gateway of the first clearinghouse can be selected. The linking clearinghouse can sort available destination gateways according to predefined rules. That is, the linking clearinghouse can provide destination gateway information of other second clearinghouses to the source gateway of the first clearinghouse based upon predefined criteria. The source gateway of the first clearinghouse can then complete a connection with a destination gateway in one of the second clearinghouses selected by the linking clearinghouse so that data, such as voice data, may be transmitted between the two clearinghouses.

In one exemplary embodiment, business and technical information about source and destination gateways between two or more clearinghouses can be shared and tracked by a linking clearinghouse. The business and technical information concerning the source and destination gateways can be combined into a routing table that is typically stored in the linking clearinghouse. This combined routing table can be used to identify destination gateways of clearinghouses that are not associated or affiliated with clearinghouses that may contain the source gateways. While individual clearinghouses are often not associated or affiliated with one another, it is not beyond the scope of the present invention to also permit clearinghouses that may have a preexisting business relationship to also utilize the services of the linking clearinghouse.

In another exemplary embodiment of the present invention, a linking clearinghouse may be limited to tracking only destination gateway IP addresses. In other words, one set of information, such as the IP addresses of the destination gateways, can be stored in a linking super-clearinghouse system. In this embodiment, the linking super-clearinghouse system of the linking clearinghouse typically does not sort the list of available destination gateways. The first clearinghouse can perform the sorting function in this exemplary embodiment.

Accordingly, when a calling party connects to a source gateway of a first clearinghouse, the source gateway can query its first clearinghouse for available destination gateways. The query can then prompt the first clearinghouse to determine whether to conduct a search for other available gateways in other second clearinghouses. If the first clearinghouse is permitted to search for destination gateways outside of the first clearinghouse (in other clearinghouses), the first clearinghouse can send a query to the linking super-clearinghouse system of the linking clearinghouse for potential destination gateways in other clearinghouses. The linking super-clearinghouse system can provide a list of available destination gateways outside of the first clearinghouse in other clearinghouses. The first clearinghouse can select a destination gateway outside of the first clearinghouse from the list by using predetermined criteria, such as calling delay, signal quality, price, etc. Once the destination gateway is selected by the first clearinghouse, a connection can be made with the destination gateway of an outside clearinghouse so that data can be transferred between the gateways.

In another exemplary embodiment of the present invention, a linking clearinghouse may contain more information than merely destination gateway IP addresses. In such an embodiment a first clearinghouse would be willing to share limited and generalized information about its gateways with the linking clearinghouse. For example, the first clearinghouse may provide a range of prices its gateways charge for originating a call. Accordingly, the linking clearinghouse may perform some prioritization or filtering before communicating the potential destination gateways to the first clearinghouse. Upon receipt of the potential destination gateways, the first clearinghouse performs additional sorting to select a gateway.

Conventional methods and systems typically do not support the selection and connection of IP voice gateways belonging to different clearinghouses. The present invention assists gateways in identifying potential terminating gateways in other clearinghouses. The present invention permits gateways to select other gateways based on criteria such pricing, speed, and quality of connection. By linking different clearinghouses, the invention can eliminate any additional signaling that would ordinarily have to occur between different clearinghouses. Increasing the pool of available gateways also serves to increase traffic for a gateway which, in turn, generates additional revenue for individual clearinghouses and the linking clearinghouse.

These and other objects, features, and advantages of the present invention may be more clearly understood and appreciated from a review of the following detailed description of the disclosed embodiments and by reference to the appended drawings and claims.

DETAILED DESCRIPTION OF THE EXEMPLARY EMBODIMENTS

The present invention is referred to herein as a clearinghouse linking method and system. Such a method and system can support communications such as telephone calls. A telephone call occurring via an IP network is often referred to as a "voice over IP" transaction. When a "voice over IP" transaction specifically involves the Internet, the description "Internet Telephony" may also be used to describe the transaction. An exemplary embodiment of the present invention will be described herein with respect to Internet Telephony. However, the principles of the present invention apply to all IP routed transactions, including, but not limited to, "voice over IP" calls, "fax over IP" calls, and "video over IP" calls.

IP telephony clearinghouses greatly simplify the interconnection of individual IP Telephony Service Providers (ITSPs). ITSPs are the providers that operate gateways for IP Telephony. By joining a single clearinghouse, an ITSP can exchange traffic with many other service providers. And more traffic, of course, brings more revenue. As the IP telephony market has matured, providers have begun to recognize that interconnections among separate IP telephony clearinghouses presents a new opportunity for additional revenue. With such interconnection, an ITSP joining a single clearinghouse gains access not just to other ITSPs belonging to that clearinghouse, but also to ITSPs that are members of the other, interconnected clearinghouses.

The conventional approach, intra-clearinghouse communication, imposes a rigorous partition between different clearinghouses. Not only is traffic strictly contained within a single clearinghouse, but key information such as pricing and traffic statistics are protected by stringent security measures. The present invention supports clearinghouse interconnection with a linking clearinghouse service. When clearinghouses interconnect with each other, rigid separation of information is no longer required.

The linking clearinghouse relies on service points distributed throughout the IP network to provide routing, authorization, and usage collection services for the clearinghouse customer. These service points, which implement communication protocols, such as the Open Settlement Protocol, allow the secure interconnection of devices administered by different service providers. The linking clearinghouse deploys service points at strategic locations on the Internet backbone, where they operate in high availability, high security, high performance configurations.

Clearinghouse Network Architecture

Figure 1:
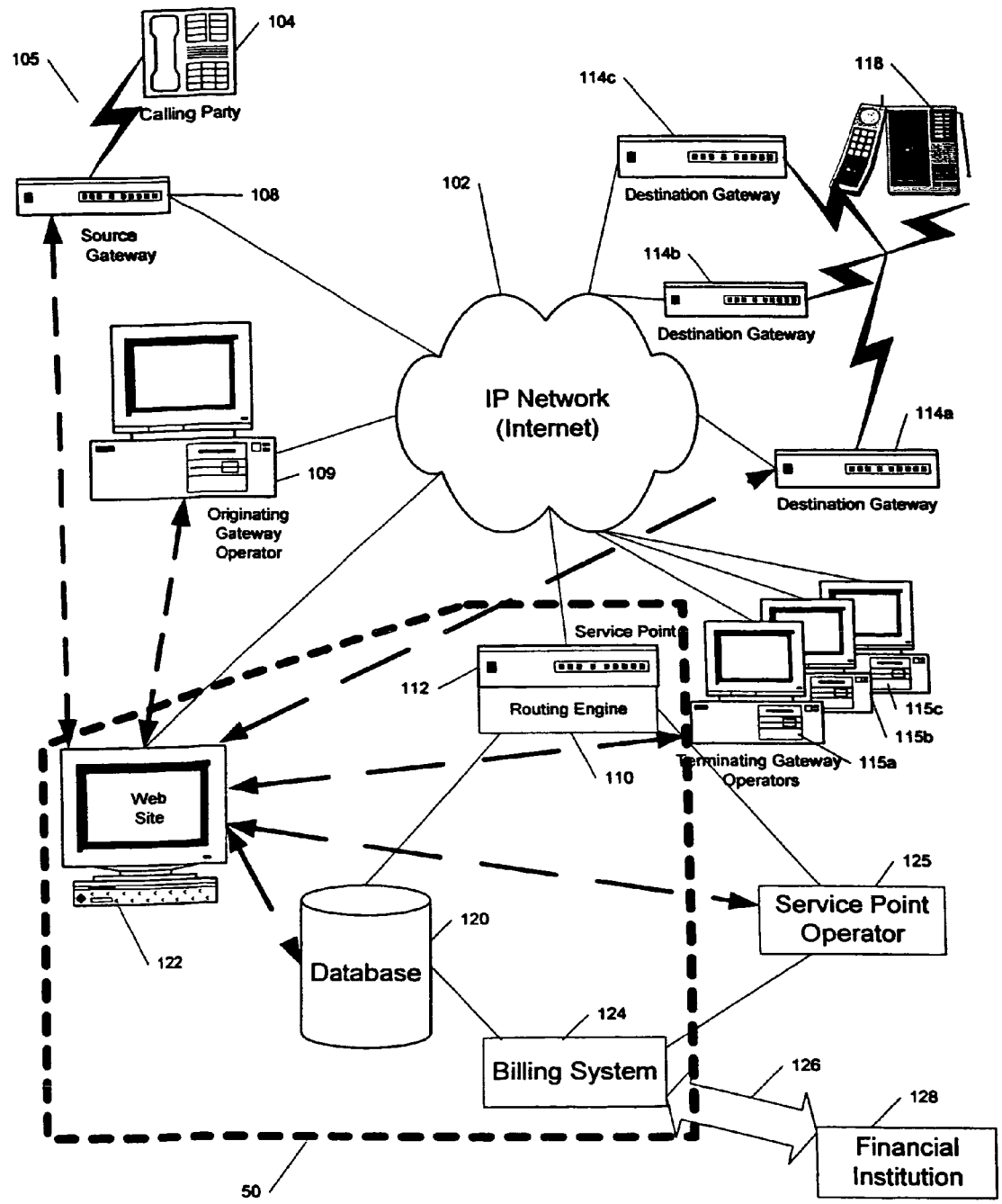
FIG. 1 is a functional block diagram illustrating one or more users that can be part of a centralized or clearinghouse system.

Referring thereto, FIG. 1 shows a network architecture that serves as an exemplary clearinghouse system. As indicated, the Internet 102 serves as the heart of the exemplary network architecture. Relying on the Internet 102 are five different systems that might participate in an Internet Telephony transaction. These five systems include: a calling party 104, a source gateway (also referred to as an originating gateway) 108, a service point 112 including a routing engine 110, a destination gateway (also referred to as a terminating gateway) 114 and a called party 118. As FIG. 1 shows, a service point 112 is coupled to a central database 120, which is also coupled to a billing and settlement system 124. While the service point 112 exists on the public Internet 102, the central database 120 and the billing and settlement system 124 remain in secured facilities. Private communication paths connect the remote equipment with the central database 120.

The calling party 104 represents the user wishing to place a telephone call. Often, the calling party 104 will rely on a standard telephone handset to place the call. In fact, in many cases the calling party 104 may not be able to distinguish Internet telephony service from standard telephone service. The calling party 104 connects to a source gateway 108 through a public telephone network 105, such as a switched circuit network. In either case, the source gateway 108 serves as a bridge between ordinary telephones and the Internet 102 by converting telephone signals into data packets (and vice versa) and transmitting the data packets over the Internet 102. A source gateway is operated by a source gateway operator 109.

Similarly, the called party 118 is the user that receives a telephone call. A called party 118 connects to a destination gateways 114 through a public telephone network 106, such as a switched circuit network. A destination gateway 114 is connected to the Internet 102 at a location that is remote from the source gateway 108. The destination gateway 114 is operated by a destination gateway operator 115 and performs the same functions as the source gateway 108, i.e., bridging phone calls between the Internet 102 and a public telephone network 106, or an equivalent thereof. Destination gateways 114 differ from source gateways 108 only in the role played in a particular call. In particular, source gateways 108 act on behalf of the calling party 104, while destination gateways 114 act on behalf of the called party 118. It is important to note that the same operator need not manage both the source gateway 108 and the destination gateway 114. In fact, the exemplary routing engine 110, is tailored for environments in which different owners operate the two types of gateways.

The service point operator 125 may be a third party that is independent of the operators of the source gateway 108 or destination gateways 114. As indicated in FIG. 1, the service point operator 125 may maintain a private communications line with the service point 112, the billing and settlement system 124 and a related web-site 122. In the exemplary operating environment, all components maintained by the service point operator 125, i.e., the service point 112, the database 120, the billing and settlement system 124 and the web-site 122, are conveniently distributed between various geographic locations. Still, those skilled in art will appreciate that all components maintained by the service point operator 125 may be incorporated in a single system (service point 112) or any number of distributed systems.

A service point 112 communicates with gateways over the Internet 102 and generally provides routing information to the source gateway 108. Given a destination phone number and other requirements (described in detail below), the service point 112, through the routing engine 110, identifies at least one appropriate destination gateway 114 to handle the telephone call.

The overall network architecture that serves as an operating environment for the present invention may be thought of as comprising three different networks, each carrying the telephone conversation. The first network is the calling party's telephone network 105 that connects the calling party to the source gateway 108. The second network is the Internet 102, which connects the source gateway 108 and the destination gateways 114 to each other. The third network is the called party's telephone network 106, which completes the connection from the destination gateway 114 to the called party 118. Although FIG. 1 (as well as this description in general) refers to the telephone connections as taking place through public telephone networks 105 and 106, Internet telephony service does not require such a connection. Some applications may use private networks, such as those provided by a private branch exchange; others may simply connect telephone handsets directly to the corresponding gateway.

Additionally, a fourth network may be added to the general network architecture. The fourth network is a banking and funds transfer network 126. A billing and settlement system 124 may be coupled to the service point 112 in order to receive information relating to the financial aspects of the Internet telephony transactions. The billing and settlement system 124 may use a banking and funds transfer network 126 to execute the financial transactions coordinated by the service point 112.

Telephone Calls Placed with a Clearinghouse System

Figure 2:
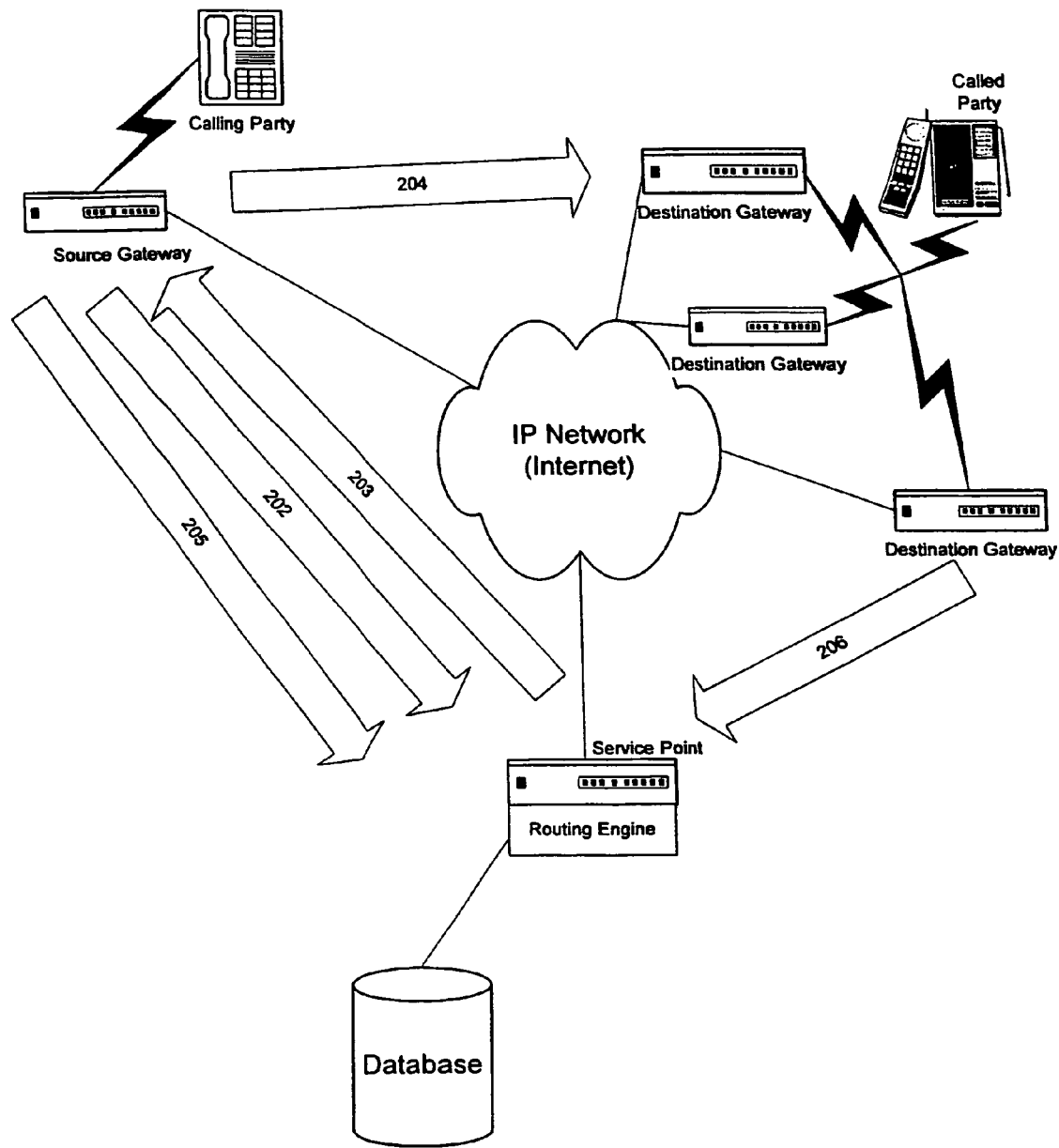
FIG. 2 is a schematic representation of an exemplary operating environment for the present invention.

FIG. 2 provides an overview of an Internet telephony call in the exemplary operating environment. At step 201, an Internet telephony call is initiated when the calling party 104 dials a telephone number, which is transmitted to the source gateway 108 for processing. The goal of the source gateway 108 is to locate a destination gateway 114*a-c* that is able to terminate the phone call. The source gateway 108 relies on the service point 112 for routing assistance.

At step 202, the source gateway 108 makes an authorization request to a service point 112. The authorization request indicates, among other things, the telephone number of the called party 118. At the service point 112, the routing engine 110 uses information in the authorization request, as well as preferences established for the source gateway's 108 cost and quality requirements, to determine which of the destination gateways 114*a-c* are eligible to complete the call.

At step 203, the service point 112 then sends an authorization response message to the source gateway 108, which includes information relating to the identity of eligible destination gateways 114. In addition, the authorization response message contains an authorization ticket for access to each eligible destination gateway 114. The authorization response ticket allows a destination gateway 114 to accept the call knowing that it has been authorized by the service point 112, and that the service point operator 125 will compensate the destination gateway operator 115 for completing the call.

Upon receipt of the authorization response message, the source gateway 108 selects a destination gateway 114 from among the list provided by the service point 112. At step 204, the originating gateway 108 then sends a setup message to the selected destination gateway 114, as specified in International Telecommunications Union (ITU) H.323 and associated standards. Those skilled in the art will recognize that the Q.931 standard may be used to define the setup message. To complete the authorization, the setup message must include the authorization ticket for the destination gateway 114. Those skilled in the art will also recognize that the user-to-user information element of the Q.931 setup message may be used to convey the authorization ticket.

Communication between the service point 112, the source gateway 108 and the destination gateways 114 does not require the use of standard protocols for any aspect of the Internet telephony calls themselves, including call setup. If the source gateway 108 and destination gateways 114 use a signaling protocol other than Q.931 (which is specified by H.323 and H.225.0), then that protocol need only be capable of including the authorization ticket in the initial setup message. The exemplary authorization ticket is approximately 2000 octets in length. Destination gateways 114*a-c* may accept or reject Internet telephony calls based on the presence and contents of this authorization ticket.

After the Internet telephony call is completed, both the source gateway 108 and the destination gateway 114 transmit a call detail report to the service point 112, as represented in steps 205 and 206. Call detail reports identify the call and record its duration. Call detail reports are stored in the database 120 and are accessed by the billing and settlement system 124 in order to reconcile financial obligations between the service point operator 125, source gateway operators 109 and destination gateway operators 115.

It should be noted that source gateway 108 and destination gateways 114 are free to establish connections without consulting a service point 112. For example, a group of gateways may all be owned by a common entity and may wish to exchange calls among themselves independent of a service point 112. In such an environment, the gateways are free to rely on a service point 112 only when no gateway in the group can serve a given phone number economically. Thus, the exemplary operating environment provides gateways with extremely flexible routing choices.

Also, those skilled in the art will appreciate that the exemplary operating environment may include multiple service points 112. Service points may be distinguished by the specific services they provide, as well as by their geographic location on the Internet 102. Geographic diversity optimizes performance by allowing a device to communicate with the closest service point 112. Proximity to a service point 112 minimizes delay in the communication exchange. Geographic diversity also increases the reliability of the operating environment. If one service point 112 becomes unavailable, devices using that service point 112 can automatically switch to a different service point (not shown) located elsewhere.

Before a gateway is provided with access to a service point 112 the responsible gateway operator must enroll as a customer of the service point operator 125. Since the enrollment process typically requires disclosure of sensitive financial information (such as bank accounts or credit card numbers), the web connection between the gateway operators 109 & 115 and the web-site 122 is secured by the secure sockets layer (SSL) protocol. The web-site 122 with user interface 35 uses SSL to authenticate itself to gateway operators 109 & 115 with digital certificates obtained from a trusted certificate authority. SSL also encrypts the information transferred between the gateway operators 109 and 115 and the web-site 122 containing user interface 35.

When the service point operator 125 accepts a gateway operator as a customer, it provides the customer with a customer number and password. The customer number is Hamming coded to protect against corruption. Once assigned, customers are allowed to change their password. The service point operator 125 may enforce certain restrictions on passwords to maximize security. Such restrictions may include, for example, a prohibition against words appearing in dictionaries, a requirement to use both upper and lower case characters and a requirement that customers change their password periodically.

After enrollment is complete, gateway operators 109 and 115 are given authorization to access and modify their accounts, via the Internet 102, through the web-site 122 as illustrated in FIG. 1. Enrolled customers may also be provided with access to timely and informative reports on their usage of a service point 112. Such reports may include up-to-the-minute billing information, potential fraud alerts, sophisticated usage statistics and detailed traffic profiles. Enrolled users may access these reports directly through the web-site 122 running a user interface using a web browser, or they can download the information for importing into their own database or spreadsheet. Users may also elect to be notified via electronic mail, fax, or other means when certain events occur. Events eligible for this service include suspicious or fraudulent activity, minimum or maximum traffic levels at particular devices, and apparent failure of a device.

An enrolled customer may activate individual devices to use the services provided by a service point 112. In the present discussion, the exemplary devices are Internet telephony gateways 108 and 114. However, those skilled in the art will appreciate that the exemplary operating environment may be configured to support a wide variety of devices. As with operator enrollment, device activation takes place across the Internet 102 using well-known web browsers. Typically, device activation will take place at the device itself.

The web-site 122 running a user interface may be configured to support several different approaches for activating devices, depending on the particular type of device. A web-site 122 running a user interface may be configured to support Windows, UNIX, and embedded operating environments. Those skilled in the art will recognize that other operating systems may also be supported.

As indicated in FIG. 1, a clearinghouse 50 may comprise the components of a service point 112 (including a routing engine 110), a database 120, a website 122 posting a user interface, and a billing and settlement system 124. A service point operator 125 may be responsible for maintaining the clearinghouse 50. A service point operator 125 may be a third party that is independent of the originating gateway operator 20 or the terminating gateway operators 15. As illustrated in FIG. 1, the service point operator 125 may maintain a private communications line with the service point 112, a billing and settlement system 124 and the website 122. In the exemplary operating environment, all components maintained by the service point operator 125 can be conveniently distributed between various geographic locations. Still, those of skill in the art will appreciate that all components maintained by the service point operator 125 may be incorporated in a single system or any number of distributed systems.

As mentioned above, a clearinghouse 50 may be configured to provide an originating gateway 108 with routing information relating to those terminating customers 31 who match the call prices and pricing criteria (and other preferences and preference criteria) set by the originating customers 26. A service point 112 communicates with gateways over the IP network 102 and generally provides routing information to an originating gateway 108. The service point 112 is coupled to the website 122, which hosts the user interface. The function of the user interface is to provide a mechanism by which originating customers and terminating customers may access their accounts maintained by clearinghouse 50.

Inter-Clearinghouse Architectures

Figure 3:
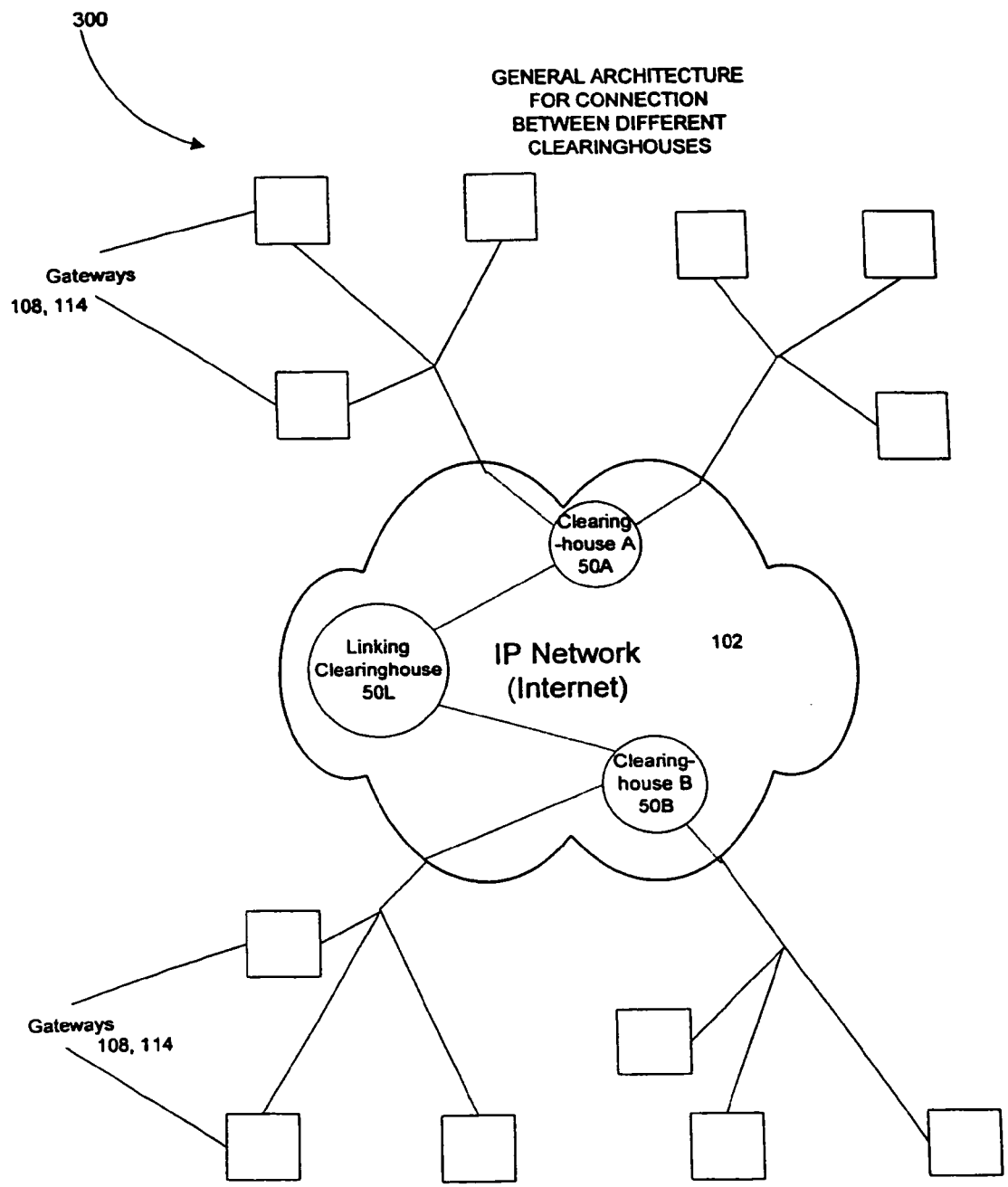
FIG. 3 is a functional block diagram illustrating the general architecture and components of an exemplary embodiment of the present invention.

FIG. 3 is a generalized architecture representing an environment in which two clearinghouses are connected. FIG. 3 is merely one example of the invention and in alternate embodiments two or more clearinghouses may be linked together. Clearinghouse 50A and clearinghouse 50B are linked to the IP network 102. Each clearinghouse has its own member gateways 108, 114 to which it provides clearinghouse services. Each gateway 108, 114 is also directly connected to the IP network 102. Gateways are operated by ITSPs and often a single ITSP will operate several gateways. A linking clearinghouse 50L is connected to the IP network 102. The linking clearinghouse 50L provides clearing and settlement services between clearinghouse 50A and clearinghouse 50B. The linking clearinghouse SOL is able to provide these services because clearinghouse 50A and clearinghouse 50B supply information about their member gateways. The amount of information clearinghouse 50A or clearinghouse 50B desires to provide to the linking clearinghouse will determine the specific architecture of the link. Three representative linking architectures are described herein.

Figure 4:
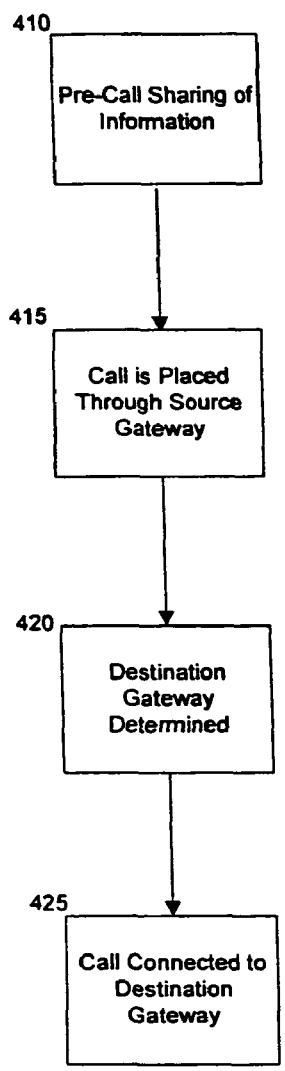
FIG. 4 is a logic flow diagram illustrating an overview of the operations involved in communicating among different clearinghouses.

FIG. 4 is a flow chart describing an overview of inter-clearinghouse communication. The first step, 410, is the pre-call sharing of information with the linking clearinghouse. The sharing of information about gateways with the linking clearinghouse is helpful in providing the linking clearinghouse services. The substance of the shared information and the party with whom it is shared is decided by the participating clearinghouse. There are a variety of business reasons a clearinghouse may wish to share only limited information about its member gateways with other clearinghouses. In step 415, a call is initiated by the calling party 104 of a first clearinghouse, such as clearinghouse 50A. The calling party 104 accesses the IP telephony network 102 through a source gateway 108. Typically, the calling party 104 initiates the call in the same manner as dialing a conventional telephone call. In some instances, the calling party 104 may be required to enter a code before dialing the destination number in order to access the IP telephony network. In step 420, a destination gateway 114 in another, second clearinghouse, such as clearinghouse 50B, is located and the IP address of the destination gateway 114 is provided to the source gateway 108. The method in which the destination gateway 114 of a second clearinghouse is determined depends on the specific architecture of the linking clearinghouse and whether the linking clearinghouse is designed to sort a list of available gateways and select a gateway from the list. Finally, in step 425, a connection is established between the source gateway 108 of the first clearinghouse 50A and the destination gateway 114 of a second clearinghouse 50B. Once the connection is established, voice data may transmitted between the calling party 104 and the called party 118.

Figure 5:
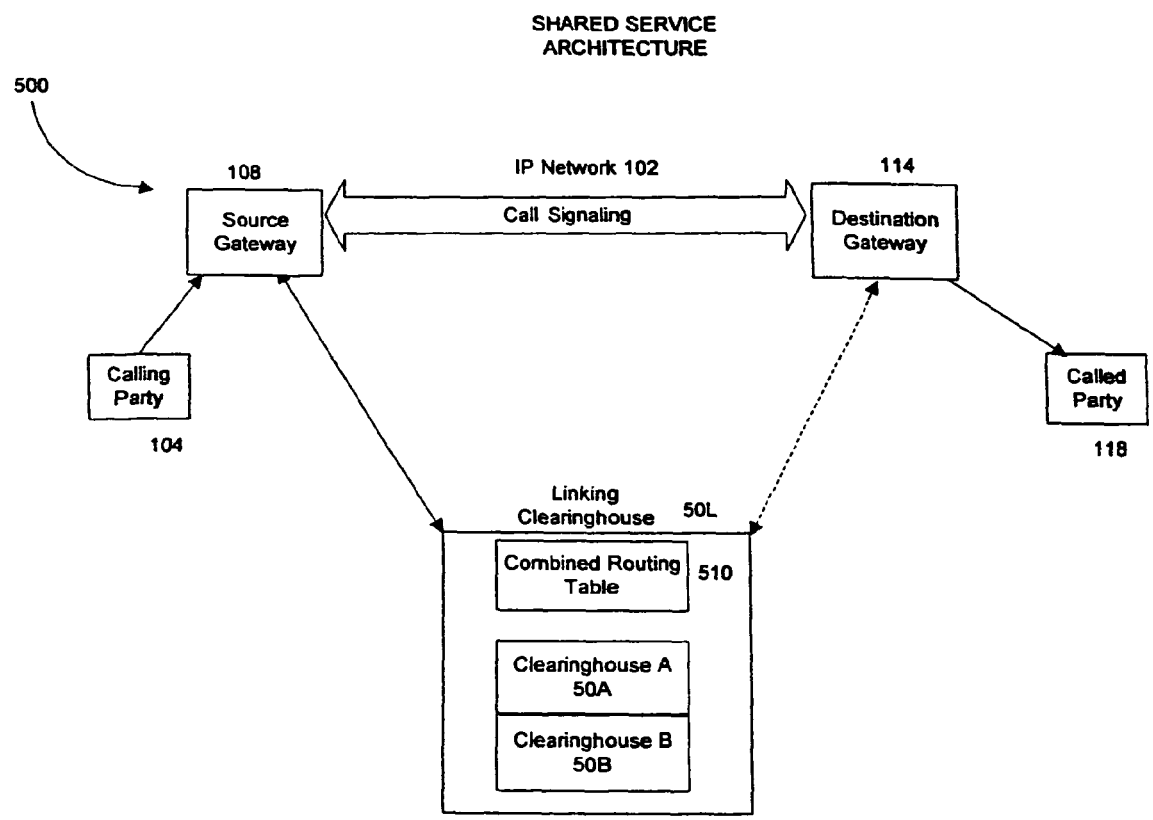
FIG. 5 is a functional block diagram illustrating an exemplary operating environment for communication among different clearinghouses using a shared service architecture.

Referring to FIG. 5, this is a block diagram representing an exemplary shared service architecture 500 of a linking clearinghouse 50L. This shared service architecture can represent the greatest sharing of information among two clearinghouses. In this example, clearinghouse 50A and clearinghouse 50B provide business and technical information about its member gateways to the linking clearinghouse 50L. A combined routing table 510 is created by the linking clearinghouse 50L. The routing table can include pricing and billing information as well as source and destination gateway information provided by clearinghouse 50A and clearinghouse 50B. All the information necessary to select the destination gateway can be contained in the combined routing table. In the shared service architecture, the calling party 104 of a first clearinghouse, such as clearinghouse 50A, accesses the IP network 102 through its source gateway 108. The source gateway 108 contacts the linking clearinghouse 50L, represented as the combined potential gateways of clearinghouse 50A and clearinghouse 50B. The destination gateway information is returned to the source gateway 108. A connection is then established between the source gateway 108 of the first clearinghouse 50A and the destination gateway 114 of a second clearinghouse, such as clearinghouse 50B over the IP network 102. Once the call signaling is completed the data, such as voice data, can be transferred between the calling party 104 of first clearinghouse 50A and the called party 118 of a second clearinghouse 50B.

Figure 6:
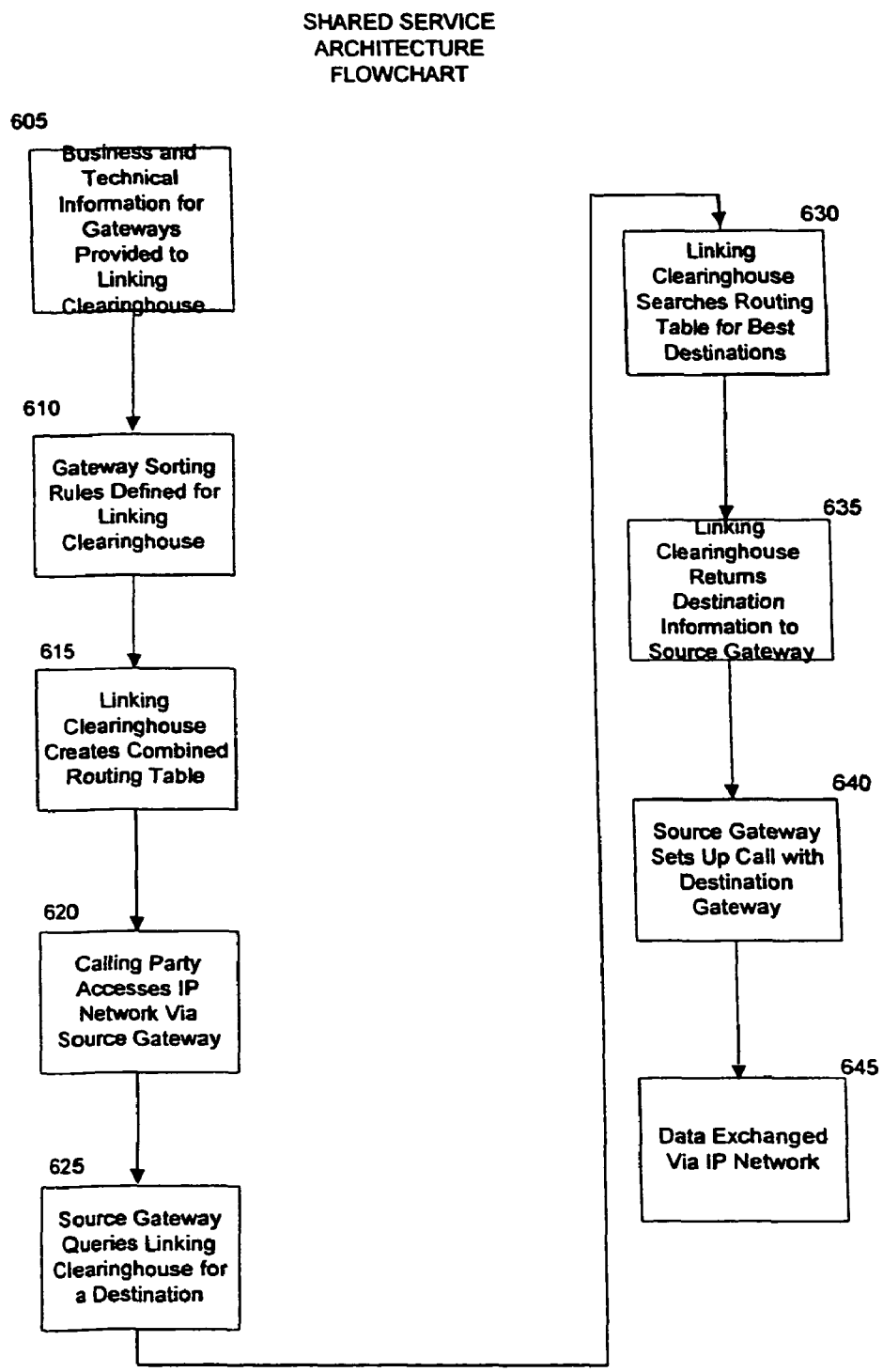
FIG. 6 is a logic flow diagram illustrating an exemplary process for routing a communication using the shared service architecture.

Referring to FIG. 6, this is a flow chart outlining an exemplary process that occurs in the shared service architecture. In the first step, 605, clearinghouse 50A and clearinghouse 50B provide their gateway and business information to the linking clearinghouse 50L. After this information is provided, in step 610, gateway sorting rules can be set up for the linking clearinghouse 50L. The gateway sorting rules determine how particular destination gateways are selected by considering factors such as cost, speed, and quality of data transmission. In step 615 the linking clearinghouse 50L creates the combined routing table 510. The combined routing table contains all of the information provided by clearinghouse 50A and clearinghouse 50B. All of the information contained in the routing table can be sufficient enough to determine a destination gateway 114.

In step 620, a call is initiated by a calling party 104 who connects to her source gateway 108 of a first clearinghouse, such as clearinghouse 50A, which provides access to IP network 102. In step 625, the source gateway 108 of the first clearinghouse 50A queries the linking clearinghouse 50L for a destination gateway 114 in another clearinghouse. When the linking clearinghouse 50L receives a query from a gateway, it can perform an initial security and authentication check to make sure the source gateway is a member of the clearinghouses subscribing with the linking clearinghouse 50L, such as clearinghouse 50A and clearinghouse 50B. In step 630, the linking clearinghouse 50L searches a combined routing table 510 for possible destinations.

The combined routing table 510 is typically a data file stored in a database at the linking clearinghouse 50L. In step 635, the linking clearinghouse 50L returns the destination gateway information of another clearinghouse, such as clearinghouse 50B, to the source gateway 108 of the first clearinghouse 50A. In step 640, the source gateway 108 of the first clearinghouse 50A sets up call signaling to establish a connection with the destination gateway 114 of the second clearinghouse 50B over the IP network 102. Call signaling is typically not routed through the linking clearinghouse 50L in this exemplary embodiment. However, call signaling can be routed through the linking clearinghouse 50L in other exemplary embodiments, as will be discussed in detail below.

In step 645, voice data is exchanged between the called party 118 and the calling party 104. One advantage of the shared service architecture is excellent routing performance due to minimizing any querying or searches conducted between clearinghouse 50A and clearinghouse 50B for available destination gateways that match predetermined criteria, such as costs, calling delay, or quality of data transmission.

Figure 7:
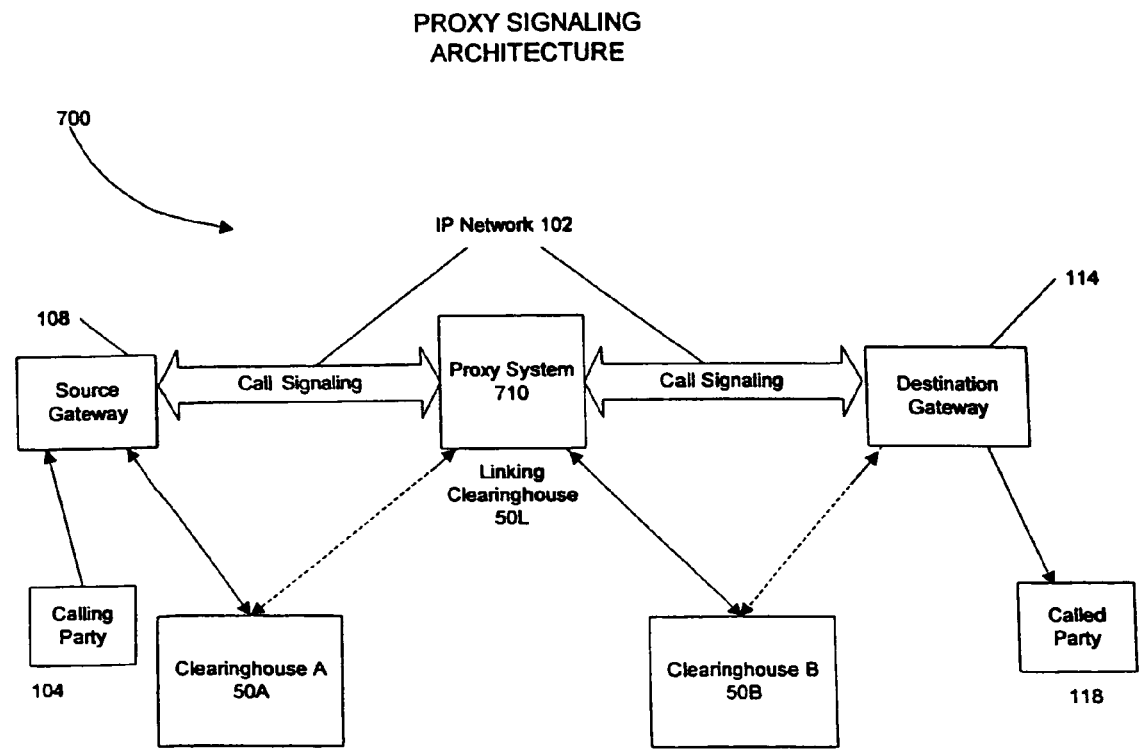
FIG. 7 is a functional block diagram illustrating an exemplary operating environment for communication among different clearinghouses using a proxy system architecture.

FIG. 7 illustrates another exemplary linking clearinghouse architecture that can be referred to as proxy signaling 700. In this type of linking clearinghouse architecture, usually information is not shared between clearinghouse 50A and clearinghouse 50B. A clearinghouse may have both business and technical reasons for not wanting to share its gateway information and pricing information with another clearinghouse. To minimize the exchange of information, the participating clearinghouses merely provide a summary of their rate plans to the linking clearinghouse 50L. The linking clearinghouse 50L uses the rate plan summaries to set up a proxy system 710 that links one or more clearinghouses together.

The proxy system 710 essentially looks like a destination gateway to a source gateway of a first clearinghouse originating a call. Further, the linking clearinghouse 50L in this exemplary embodiment appears to be a source gateway to a destination gateway of a second clearinghouse selected to complete the call.

For example, when a call is initiated by a party at the source gateway 108, clearinghouse 50A is contacted. Clearinghouse 50A provides the source gateway 108 with the proxy system 710 (running in linking clearinghouse 50L) as a destination gateway. Call signaling is established between the source gateway 108 of the first clearinghouse 50A and the proxy system 710. The proxy system 710 then acts as a source gateway and contacts a second clearinghouse, such as clearinghouse 50B. Clearinghouse 50B searches for a destination gateway 114 and provides this information to the proxy system 710 of the linking clearinghouse 50L. The proxy system 710, acting as a source gateway then completes the connection with the provided destination gateway 114 of the second clearinghouse 50B. Once the connection is complete, data, such as voice data, can be transferred between the calling party 104 and the called party 118 via the proxy system 710.

Figure 8:
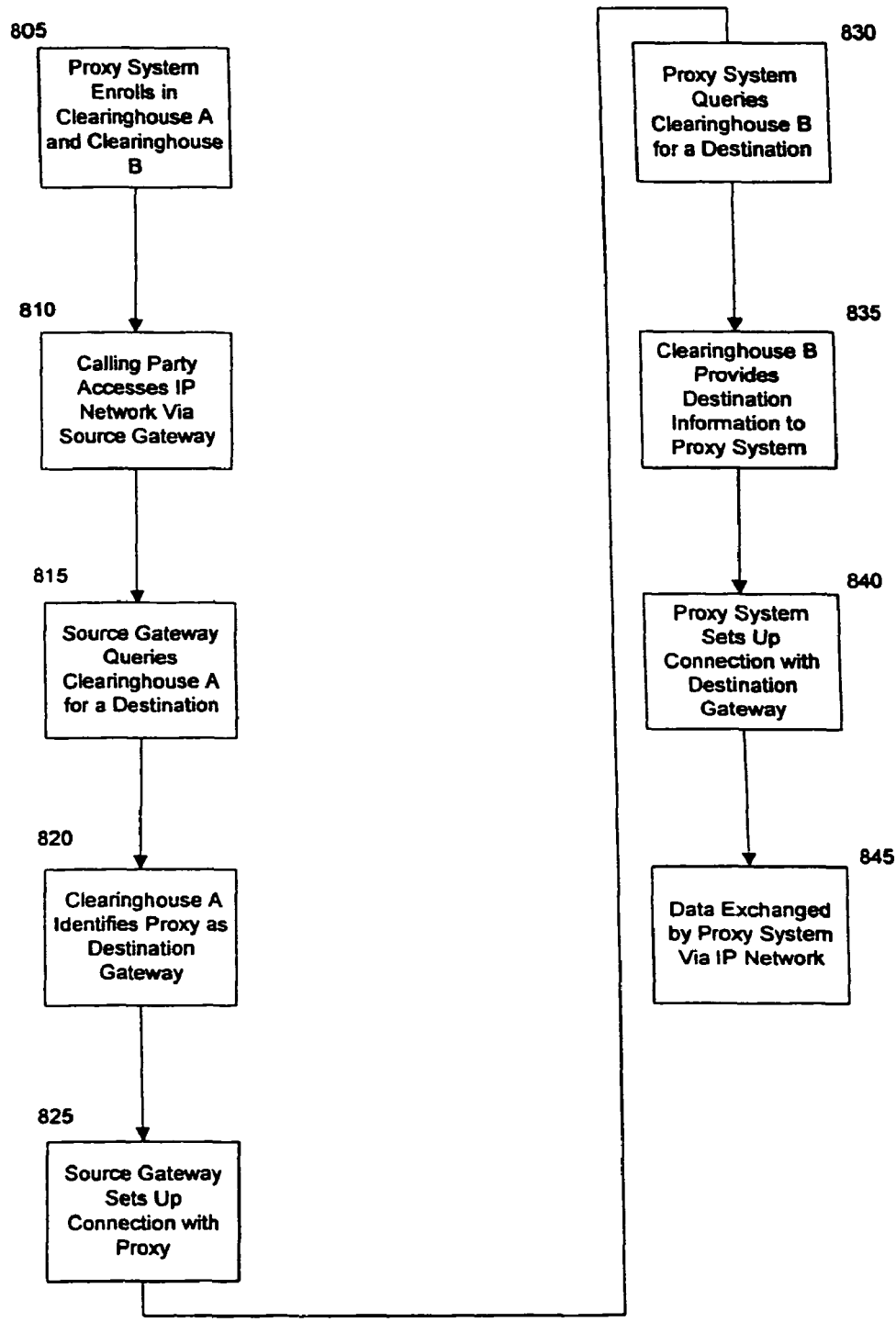
FIG. 8 is a logic flow diagram illustrating an exemplary process for routing a communication using the proxy system architecture.

FIG. 8 is an exemplary process for the proxy signaling architecture illustrated in FIG. 7. In step 805, the proxy system 710 of linking clearinghouse 50L enrolls as an available gateway in subscribing clearinghouses, such as clearinghouse 50A and clearinghouse 50B. The step of enrolling in the clearinghouses requires the proxy system 710 of the linking clearinghouse 50L to provide an IP network address and business information to each clearinghouse. In exchange, the linking clearinghouse 50L operating the proxy system 710 will receive summary information about the rates in each clearinghouse.

In step 810, the calling party 104 accesses the IP network 102 through a source gateway 108 in a first clearinghouse, such as clearinghouse 50A. In step 815, the source gateway 108 queries clearinghouse 50A for a destination. The operator of clearinghouse A ensures that the source gateway 108 is in fact a member of the clearinghouse. In step 820, clearinghouse 50A identifies the proxy system 710 of the linking clearinghouse 50L as a destination gateway. In step 825, the source gateway 108 establishes call signaling with the proxy system 710 of the linking clearinghouse 50L via the IP network 102. As noted above, the proxy system 710 of linking clearinghouse 50L appears to be a destination gateway to the source gateway 108 of the first clearinghouse 50A.

The proxy system 710 of the linking clearinghouse 50L then contacts a second clearinghouse, such as clearinghouse 50B, as a source gateway in step 830 and queries clearinghouse 50B for a destination. Essentially the linking clearinghouse 50L operating the proxy system 710 appears as a customer to clearinghouse 50A and clearinghouse 50B. In step 835, clearinghouse 50B identifies destination gateways for the proxy system 710. In step 840, call signaling is established between the proxy system 710 of the linking clearinghouse 50L and the destination gateway 114 of the second clearinghouse 50B via the IP network 102. In step 845, once call signaling is established, data, such as voice data, can be transferred between the calling party 104 of the first clearinghouse 50A and the called party 118 of the second clearinghouse 50B. The proxy signaling architecture allows the individual clearinghouses to remain in control of much of the routing process. However, this architecture can increase call setup delay and lose the function of evaluating end-to-end quality of routing service.

Figure 9:
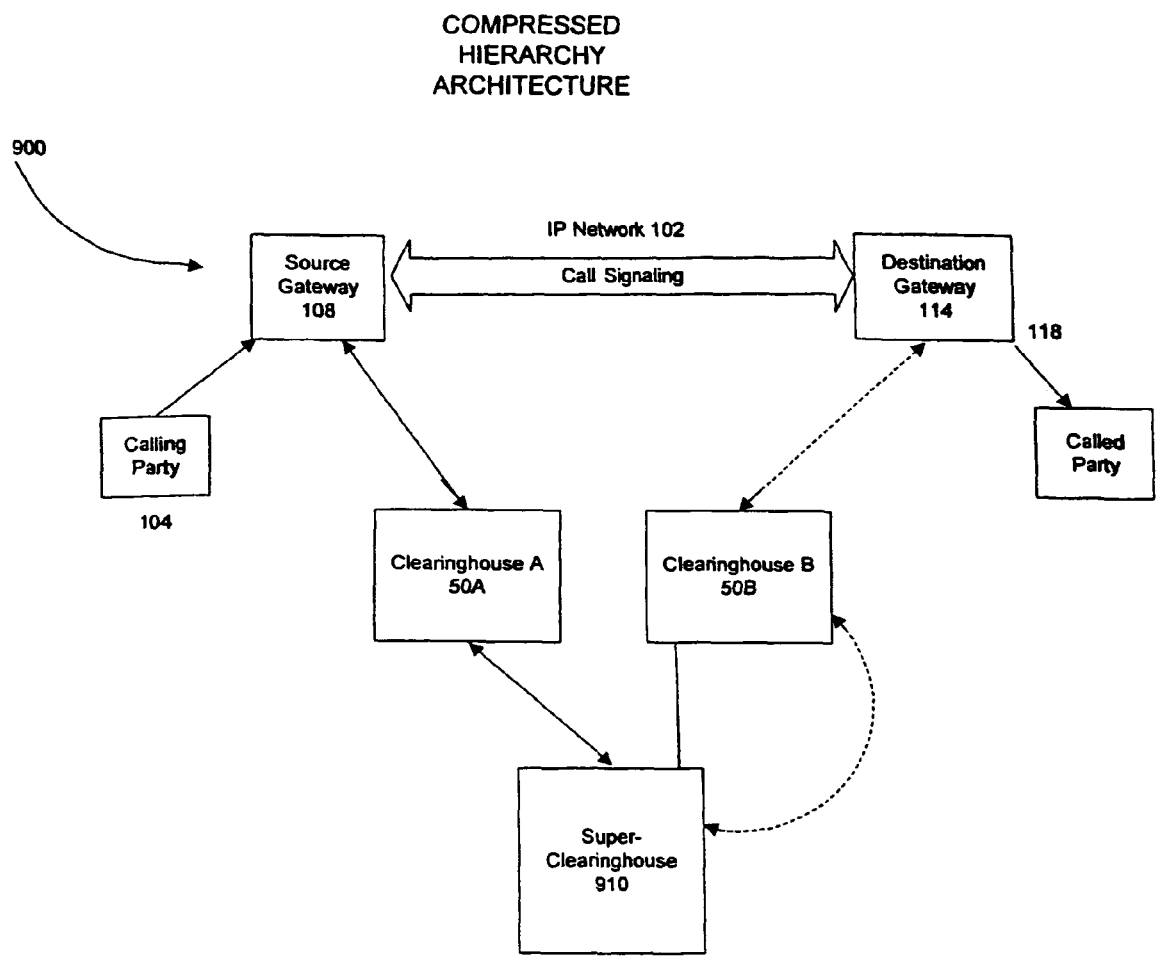
FIG. 9 is a functional block diagram illustrating an exemplary operating environment for communication among different clearinghouses using a compressed hierarchy architecture.

FIG. 9 illustrates another exemplary architecture for a linking clearinghouse 50L referred to as a compressed hierarchy 900. The compressed hierarchy 900 is an intermediate approach between the shared service architecture of FIG. 5 and the proxy system architecture of FIG. 7 in that it involves sharing of limited or reduced information between the clearinghouses. In the compressed hierarchy architecture 900, clearinghouse 50A and clearinghouse 50B are linked through a super-clearinghouse system 910 of a linking clearinghouse 50L. In the exemplary embodiment illustrated in FIG. 9, the super-clearinghouse system 910 of linking clearinghouse 50L typically contains only information identifying the potential destination gateways from clearinghouse 50B. A calling party 104 accesses the IP network 102 through its source gateway 108. The source gateway 108 contacts clearinghouse 50A. Clearinghouse 50A decides whether or not the call will be linked through another clearinghouse. If the destination gateway of another clearinghouse is to be used to complete the call, clearinghouse 50A will send a query to the super-clearinghouse system 910 of the linking clearinghouse 50L for destination gateway information. The super-clearinghouse system 910 searches its database of available destination gateways in other clearinghouses, such as clearinghouse 50B, and provides this information to clearinghouse 50A.

In this exemplary embodiment, clearinghouse 50A contains criteria for choosing the best destination gateway from the available destination gateways provided by the super-clearinghouse system 910. In an alternative embodiment of the present invention, the super-clearinghouse system 910 may also contain criteria for a preliminary evaluation of destination gateways. The best destination gateway is then provided by clearinghouse 50A to the source gateway 108 of the first clearinghouse 50A. The source gateway 108 of the first clearinghouse 50A can then establish call signaling with the destination gateway 114 of the second clearinghouse 50B. Once a connection is completed, the calling party 104 of the first clearinghouse 50A and called party 118 of the second clearinghouse 50B can exchange data, such as voice data.

Figure 10:
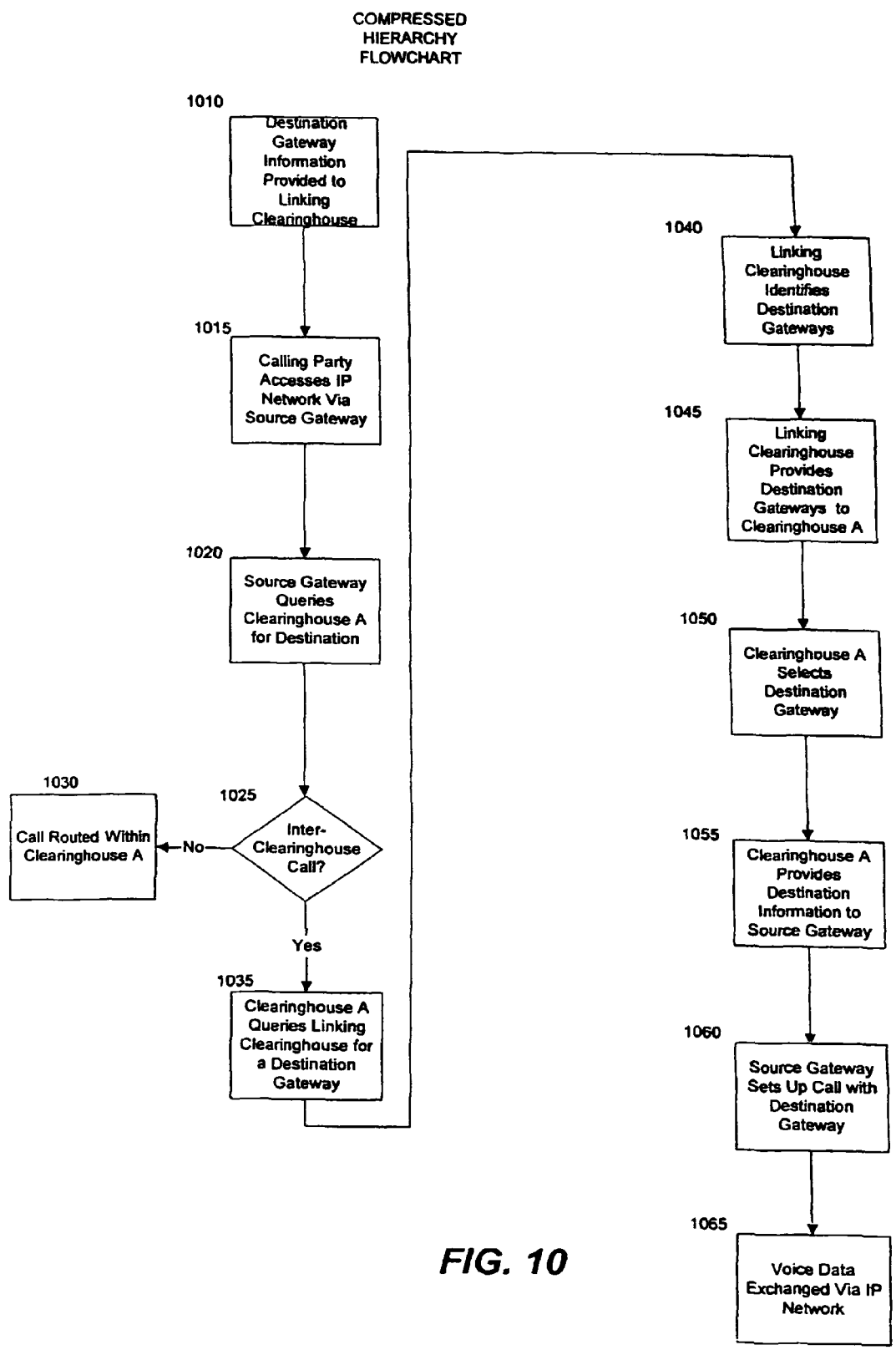
FIG. 10 is a logic flow diagram illustrating an exemplary process for routing a communication using the compressed hierarchy architecture.

FIG. 10 illustrates an exemplary process for call signaling in a compressed hierarchy architecture 900. In step 1010, the destination gateway information is provided from clearinghouse 50B to the super-clearinghouse system 910 of the linking clearinghouse 50L.

By providing this information to the super-clearinghouse system 910, it can eliminate any additional steps of contacting clearinghouse 50B when an actual call is made. In step 1015, a call is initiated and the calling party 104 accesses the IP network 102 by contacting the source gateway 108. In step 1020, the source gateway queries clearinghouse 50A for a destination gateway. In step 1025, clearinghouse 50A decides whether this call will be an inter-clearinghouse call based on predetermined criteria agreed to by the source gateway 108. If it is not an inter-clearinghouse call, the "No" branch is followed to step 1030 where the call is routed within clearinghouse 50A.

If this call can be routed to other clearinghouses, the "Yes" branch is followed to step 1035 where clearinghouse A will send a query to the super-clearinghouse system 910 of the linking clearinghouse SOL for a destination gateway. In step 1040, the super-clearinghouse system 910 will identify available destination gateways from the information provided by clearinghouse 50B. In step 1045, the super-clearinghouse system 910 provides potential destination gateways to clearinghouse 50A. In step 1050, clearinghouse 50A will select a destination gateway based on predetermined criteria established by the gateways belonging to clearinghouse A. In an alternative embodiment, the super-clearinghouse system 910 may contain criteria for performing an initial evaluation of destination gateways before forwarding information to clearinghouse 50A. In step 1055, clearinghouse 50A provides the destination gateway information to the source gateway 108. In step 1060, the source gateway 108 of clearinghouse 50A sets up a connection with the destination gateway 114 of clearinghouse 50B via the IP network 102. Finally, in step 1065, data, such as voice data, may be exchanged between the gateways. Relative to the share service architecture illustrated in FIG. 5, the compressed hierarchy architecture 900 of FIG. 9 can result in a longer setup delay than the shared service architecture 500. However, compressed hierarchy may offer added security to clearinghouses that do not wish to disclose much of their business information.

FIG. 9 also embodies an alternative to the compressed hierarchy architecture called simple hierarchy architecture. The operation of the simple hierarchy architecture is largely similar to the compressed hierarchy architecture except that the destination gateway information of clearinghouse 50B is not stored in the super-clearinghouse 910. This difference requires an extra step of signaling between super-clearinghouse 910 and clearinghouse 50B in order to retrieve the potential destination gateways. In comparison with the compressed hierarchy architecture, the additional signaling step causes increased delay with the simple hierarchy architecture.

Figure 11:
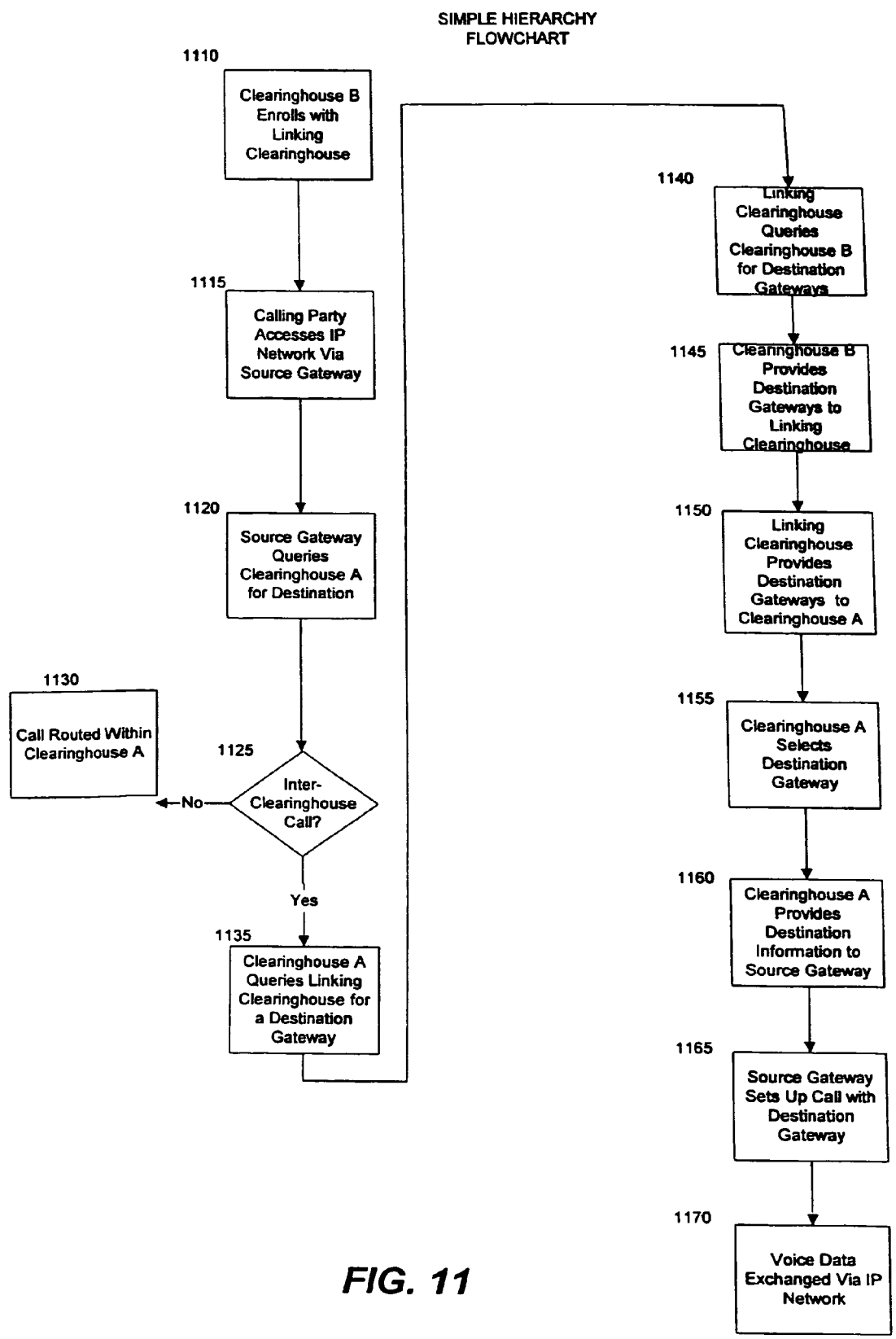
FIG. 11 is a logic flow diagram illustrating an exemplary process for routing a communication using the simple hierarchy architecture.

FIG. 11 illustrates an exemplary process for IP network telephony in a simple hierarchy architecture. In step 1110, a clearinghouse, such as clearinghouse 50B, enrolls with the super-clearinghouse system 910 of the linking clearinghouse 50L. By enrolling, clearinghouse 50B is receiving the services of linking clearinghouse 50L, but is not providing information about its own gateways. In step 1115, a call is initiated and the calling party 104 accesses the IP network 102 by contacting the source gateway 108. In step 1120, the source gateway queries clearinghouse 50A for a destination gateway. In step 1125, clearinghouse 50A decides whether this call will be an inter-clearinghouse call based on predetermined criteria agreed to by the source gateway 108. If it is not an inter-clearinghouse call, the "No" branch is followed to step 1130 where the call is routed within clearinghouse 50A.

If this call can be routed to other clearinghouses, the "Yes" branch is followed to step 1135 where clearinghouse A will send a query to the super-clearinghouse system 910 of the linking clearinghouse 50L for a destination gateway. In step 1140, the linking clearinghouse 50L queries clearinghouse 50B for destination gateways. This additional step distinguishes the simple hierarchy from the compressed hierarchy architecture. In step 1145, clearinghouse 50B provides destination gateways to the super-clearinghouse system 910. In step 1150, the super-clearinghouse system 910 forwards the potential destination gateways to clearinghouse 50A. In step 1155, clearinghouse 50A selects a destination gateway based on predetermined criteria established by the gateways belonging to clearinghouse 50A. In step 1160, clearinghouse 50A provides the destination gateway information to the source gateway 108. In step 1165, the source gateway 108 of clearinghouse 50A sets up a connection with the destination gateway 114 of clearinghouse 50B via the IP network 102. Lastly, in step 1170, data, such as voice data, may be exchanged between source gateway 108 and destination gateway 114.

The common features among all these architectures are that they encourage sharing of information among different clearinghouses. This sharing of information can eliminate additional signaling and routing of signals which causes delays in establishing connections. The linking of clearinghouses can also increase traffic over the networks which, in turn, increases revenues for individual clearinghouses as well as the linking clearinghouse 50L.

Financial Framework for Inter-Clearinghouse Communication

In contrast to traditional switched network telephony service, rates and performance of telephony service over the IP network are not well established. This can be attributed to the absence of agreements among ITSPs that operate gateways. As noted above, clearinghouses can be created to remedy this problem to some extent. However, existing clearinghouses will need financial incentives to interconnect because of the unknown variables concerning rates and performance among clearinghouses. The description that follows is an exemplary scheme for providing financial incentive for clearinghouses to interconnect.

Clearinghouses that choose to subscribe to the linking service of linking clearinghouse 50L may specify a termination markup and an origination discount for telephony traffic. The termination markup can be a minimum percentage increase (over intra-clearinghouse prices) in the cost for calls that the clearinghouse terminates for other clearinghouses. The origination discount can be the minimum percentage decrease in the cost (to the clearinghouse) for calls that the clearinghouse ITSPs originate through the linking clearinghouse. The following two examples illustrate the pricing of a typical linking clearinghouse service.

Table 1 considers an inter-clearinghouse call that originates with an ITSP belonging to Clearinghouse A. Clearinghouse A pre-establishes items 1 and 2 in that table. First, it determines what the clearinghouse will charge the ITSP for the call; in the example, the total charge is $30.00. Next, Clearinghouse A determines a origination discount for linking services. (Note Clearinghouse A sets this discount for its own purposes; it may or may not pass it on to its ITSP customers; the example assumes that the clearinghouse retains the entire discount itself.) In the example the clearinghouse has set its origination discount to be 10%. These two quantities determine the origination price for the call, which is $27.00. The termination price for the call (derived below) is $12.00. The linking clearinghouse calculates the actual price for the call as the average of the origination and termination prices. In this example, the average of $27 and $12 is $19.50. The linking clearinghouse charges Clearinghouse A a $1.00 service fee, so the total cost to Clearinghouse A is $20.50.

Since the clearinghouse is charging its ITSP customer $30.00 for the call, the call results in a $9.50 profit for Clearinghouse A.

TABLE 1

Inter-Clearinghouse Traffic Originating with
ITSP Belonging to Clearinghouse A

| | | |
|---|---|---|
| 1. | Termination fee billed to originating ITSP by Clearinghouse A | $30.00 |
| 2. | Clearinghouse A origination discount for linking service | 10% |
| 3. | Linking Clearinghouse originating price (1 less 2) | $27.00 |
| 4. | Linking Clearinghouse terminating price | $12.00 |
| 5. | Rated price for linking service (average of 3 and 4) | $19.50 |
| 6. | Linking Clearinghouse service fee | $1.00 |
| 7. | Clearinghouse A cost (5 plus 6) | $20.50 |
| 8. | Clearinghouse A profit (1 less 7) | $9.50 |

Table 2 considers the same call from the opposite perspective—that of Clearinghouse B. It is an ITSP belonging to Clearinghouse B that terminates the inter-clearinghouse call. In this case the clearinghouse pre-establishes a termination fee ($10.00) and a linking markup (20%). Together, these set the termination price at $12.00. The average of the termination price and the origination price ($27.00) determines the rated price for the call: $19.50. Clearinghouse B collects this much from the linking clearinghouse, less a linking service fee of $2.00. The total revenue for Clearinghouse B, therefore, is $17.50. Since the clearinghouse owes its terminating ITSP $10.00, the clearinghouse receives a profit of $7.50 for the call.

TABLE 2

Inter-Clearinghouse Traffic Terminating at
ITSP Belonging to Clearinghouse B

| | | |
|---|---|---|
| 1. | Termination fee paid to terminating ITSP by Clearinghouse B | $10.00 |
| 2. | Clearinghouse B termination markup for linking service | 20% |
| 3. | Linking Clearinghouse terminating price (1 plus 2) | $12.00 |
| 4. | Linking Clearinghouse originating price | $27.00 |
| 5. | Rated price for linking service (average of 3 and 4) | $19.50 |
| 6. | Linking Clearinghouse service fee | $2.00 |
| 7. | Clearinghouse B revenue (5 less 6) | $17.50 |
| 8. | Clearinghouse B profit (7 less 1) | $7.50 |

Table 3 shows the complete revenue flow for the example call. The revenue can begin with the originating ITSP, which pays $30.00 to its clearinghouse for the call. That clearinghouse (Clearinghouse A in the example) retains $9.50 and passes the remaining $20.50 of revenue to the linking clearinghouse. The linking clearinghouse retains $3.00 and pays the terminating clearinghouse (Clearinghouse B) $17.50. Finally, the terminating clearinghouse pays its ITSP $10.00 for the call, keeping $7.50 in gross profit

TABLE 3

Revenue Flow for Linking Clearinghouse Example

| Originating ITSP | $30.00 | Originating Clearinghouse (retains $9.50) | $20.50 | LinkingService (retains $3.00) | $17.50 | Terminating Clearinghouse (retains $7.50) | $10.00 | Terminating ITSP |
|---|---|---|---|---|---|---|---|---|

The two important quantities in the revenue calculation can be the origination discount and the termination markup. Both values can be defined by the participating clearinghouses when they enable linking clearinghouse service. The origination discount, which applies to the originator of telephony traffic, can be the minimum discount the originator receives for using the linking service. This discount represents a lower cost than the originator would have to pay if the call remained completely within the originating clearinghouse. As the example shows, the originator will almost always receive an even greater discount, though the exact amount depends on prices set by terminating clearinghouses and ITSPs.

The termination markup, on the other hand, can be the minimum markup that the terminator receives for accepting telephony traffic. The markup can be above and beyond what the terminator would receive if the call was completely within a single clearinghouse. Again, the actual markup will typically be greater, depending on the origination price determined by originators. Both the origination discount and termination markup are applied before the calculation of any linking clearinghouse service fees.

In summary, the present invention supports the linking of IP telephony clearinghouses. By providing a linking service between clearinghouses, IP telephony traffic is increased and greater revenues are generated. The linking of clearinghouses also improves routing and the quality of the transmitted data by reducing the amount of signaling. The linking service can also support the billing and settlement needs of the clearinghouses it links. Finally, the linking service is flexible in that in can be implemented in various ways to suit the needs of clearinghouse customers. Specifically, the amount of information a clearinghouse wishes to disclose can by controlled by the type of linking architecture.

Those skilled in the art will appreciate that the invention has a wide range of applications beyond voice communication via the Internet. For example, the invention could also be implemented to support the transmission of other multimedia communications over a distributed computing environment. Furthermore, the different architectures discussed are not exclusive of each other and may be employed in combination. Other embodiments of the invention may link multiple clearinghouses together in various combinations.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalents thereof.

What is claimed is:

1. A method for routing internet protocol transactions between gateways of different clearinghouses, comprising the steps of:
   tracking internet protocol transactions of first gateways with a first clearinghouse;
   tracking internet protocol transactions of second gateways with a second clearinghouse;
   receiving gateway information associated with the first clearinghouse;
   receiving gateway information associated with the second clearinghouse;
   storing the received gateway information in a database of a linking clearinghouse prior to a call;
   receiving a destination gateway request from a source gateway of the first clearinghouse;
   generating a list of available destination gateways of the second clearinghouse based upon the received gateway information and by creating a combined routing table, the combined routing table comprises gateway information from the first clearinghouse and the one or more second clearinghouses; and
   selecting a destination gateway from the list based on one or more business rules.

2. The method of claim 1, further comprising completing the internet protocol transaction between the source gateway of the first clearinghouse and the selected destination gateway of the second clearinghouse, the internet protocol transaction comprising an internet telephony call.

3. The method of claim 1, wherein the step of selecting a destination gateway further comprises the step of sorting destination gateways based upon the one or more business rules.

4. The method of claim 3, wherein the business rules further consider at least one of speed and quality of data transmission for completing a internet protocol transaction.

5. The method of claim 1, wherein the business rules further consider at least one of speed and quality of data transmission for completing a internet protocol transaction.

6. The method of claim 1, wherein the linking clearinghouse performs the step of selecting a destination gateway from the list.

7. The method of claim 6, wherein the business rules further consider at least one of speed and quality of data transmission for completing a internet protocol transaction.

8. A system for routing internet protocol transactions between gateways, comprising:
   a first clearinghouse comprising one or more first gateways connected to a first computer network;
   a second clearinghouse comprising one or more second gateways connected to a second computer network; and
   a linking clearinghouse connected to the first and second clearinghouse, for receiving gateway information from said first and said second clearinghouses prior to an internet protocol transaction associated with first gateways of the first clearinghouse and associated with second gateways of the second clearinghouse, for tracking internet protocol transactions of the first gateways being tracked by the first clearinghouse and for tracking internet protocol transactions of the second gateways being tracked by the second clearinghouse, the linking clearinghouse generating a list of available destination gateways based upon the gateway information in response to internet protocol transactions associated with the first and second gateways and by creating a combined routing table, the combined routing table comprises gateway information from the first clearinghouse and one or more second clearinghouses, and the linking clearinghouse selecting a destination gateway from the list based on one or more business rules.

9. The system of claim 8, wherein the first computer network and second computer network each comprise an IP network, the internet protocol transactions comprising one or more internet telephony calls.

10. The system of claim 8, wherein the internet protocol transactions of the first gateways being tracked by the first clearinghouse and the internet protocol transactions of the second gateways being tracked by the second clearinghouse comprise internet telephony type calls.

11. The system of claim 8, wherein the linking clearinghouse receives a cost schedule from the first clearinghouse and from the second clearinghouse.

12. The system of claim 11, wherein the internet protocol transactions of the first gateways being tracked by the first clearinghouse and the internet protocol transactions of the second gateways being tracked by the second clearinghouse comprise internet telephony type calls.

13. The system of claim 8, wherein the one or more business rules further evaluate at least one of speed and quality of data transmission for completing a internet protocol transaction.

14. The system of claim 13, wherein the internet protocol transactions of the first gateways being tracked by the first clearinghouse and the internet protocol transactions of the second gateways being tracked by the second clearinghouse comprise internet telephony type calls.

15. The system of claim 8, wherein the gateway information received by said linking clearinghouse comprises destination gateway IP address information.

16. A method for routing internet protocol transactions between gateways, comprising the steps of:
   receiving first criteria from a first clearinghouse with a linking clearinghouse;
   receiving second criteria from a second clearinghouse with the linking clearinghouse; enrolling the linking clearinghouse as a destination gateway in the first clearinghouse;
   receiving a internet protocol transaction from the first clearinghouse with the linking clearinghouse;
   generating a list of available destination gateways operating under control of the second clearinghouse; and
   computing a cost for routing internet protocol transactions between gateways, wherein computing the cost comprises:
      applying a price discount to the cost of originating a internet protocol transaction with a gateway from the first clearinghouse; and
      applying a price increase to the cost of terminating the internet protocol transaction with a gateway from the second clearinghouse.

17. The method of claim 16, wherein the first criteria and second criteria comprise summary interconnect criteria, the internet protocol transaction comprising an internet telephony call.

18. The method of claim 17, wherein the interconnect criteria comprises one or more rate plans.

19. The method of claim 18, wherein the internet protocol transactions of the first gateways being tracked by the first clearinghouse and the internet protocol transactions of the second gateways being tracked by the second clearinghouse comprise internet telephony type calls.

20. The method of claim 16, wherein the internet protocol transactions of the first gateways being tracked by the first clearinghouse and the internet protocol transactions of the second gateways being tracked by the second clearinghouse comprise internet telephony type calls.

* * * * *